(12) United States Patent
Troutman

(10) Patent No.: US 7,640,045 B2
(45) Date of Patent: Dec. 29, 2009

(54) MOBILE RECEIVER

(76) Inventor: Jeffrey J. Troutman, 235 Mall Route Rd., Sinking Springs, PA (US) 19608

( * ) Notice: Subject to any disclaimer, the term of this patent is extended or adjusted under 35 U.S.C. 154(b) by 707 days.

(21) Appl. No.: 11/001,910

(22) Filed: Dec. 2, 2004

(65) Prior Publication Data

US 2005/0130583 A1 Jun. 16, 2005

Related U.S. Application Data

(60) Provisional application No. 60/527,343, filed on Dec. 5, 2003.

(51) Int. Cl.
*H04M 1/00* (2006.01)
(52) U.S. Cl. .............. 455/575.8; 455/3.02; 455/90.3
(58) Field of Classification Search ............. 455/575.8
See application file for complete search history.

(56) References Cited

U.S. PATENT DOCUMENTS

| | | | | |
|---|---|---|---|---|
| 5,404,583 | A * | 4/1995 | Lalezari et al. | 455/90.3 |
| D418,836 | S * | 1/2000 | Matt et al. | D14/196 |
| 6,785,656 | B2 | 8/2004 | Patsiokas | |
| 2003/0126620 | A1* | 7/2003 | Hayakawa | 725/133 |
| 2004/0147295 | A1* | 7/2004 | Domes | 455/575.1 |
| 2005/0099547 | A1* | 5/2005 | Vitito | 348/739 |
| 2006/0128473 | A1* | 6/2006 | Vitito | 463/46 |
| 2007/0047198 | A1* | 3/2007 | Crooijmans et al. | 361/686 |
| 2007/0077965 | A1* | 4/2007 | Fox | 455/557 |
| 2008/0163049 | A1* | 7/2008 | Krampf | 715/700 |

OTHER PUBLICATIONS

Website SIRIUS Satellite Radio: http://www.sirius.com/servlet/ContentServer?pagename=Sirius/CachedPage&c=ProductAsset&cid=1093551683120, Oct. 1, 2004.
Website XM Radio: http://www.xmsr.com/catalog/product_detail.jsp?id=31129&type=Accessory, Nov. 1, 2004.
Website SIRIUS Satellite Radio: http://www.sirius.com/servlet/ContentServer?pagename=Sirius/CachedPage&c=ProductAsset&cid=1072114056976, Oct. 1, 2004.
Website XM Radio: http://www.xmradio.com/skyfi/onthego.jsp, Nov. 1, 2004.

* cited by examiner

*Primary Examiner*—Yuwen Pan
*Assistant Examiner*—Ajibola Akinyemi
(74) *Attorney, Agent, or Firm*—Christian M. Bauer

(57) ABSTRACT

A mobile receiver having a housing for a satellite receiver adapted to receive satellite radio frequencies is provided. Attached to the housing and disposed over the satellite receiver is a protective covering. The housing has at least one user interface integral with a surface of the housing and at least one impact resistance member attached to the housing. The protective covering shields the satellite receiver from external contamination.

15 Claims, 5 Drawing Sheets

MOBILE RECEIVER

CROSS REFERENCE TO RELATED APPLICATIONS

This application is claims priority to provisional application 60/527,343 filed Dec. 5, 2003.

BACKGROUND OF THE INVENTION

The appearance and function of the conventional radio has developed in response to the environment of its use. For example, Bose developed a small, low profile Wave® radio to produce the sort of room-filling sound you would expect from a much larger audio system. On the other hand, JVC developed the HX-Z1 Tower of Power mini system that expands the radio into a small home audio system. These radios are suitable for mild climate, indoor uses where the radio remains substantially in the same geographic location.

People who work outdoors, for example general contractors, do not have the luxury of working in a mild climate and fixed geographic location. General contractors work in varied environments (e.g., the cold of winter, or the direct heat of the sun in the summer) and different geographic locations (e.g., they move from job site location to job site location). A general contractor's radio must therefore be able to withstand environmental contamination such as wind, snow, dirt, dust, and rain; must be able to withstand the hazards of the jobsite such as being knocked over, dropped, and subjected to vibrations; and must also have the electronic components to receive, transform and amplify the radio signal into an audio signal.

The first problem that a general contractor may have with a conventional radio is the radio reception may be poor in certain geographical locations. In addition, the contractor's favorite radio station may not be the same or may not be offered at all depending on the geographic location. This is because a conventional (AM/FM) transmitter sends radio waves into the air in a way that mimics the original sounds sent by the radio studio, the receiver then pick these waves up and they are converted back into an audio signal, which is converted back into sound waves by the loud speakers. This method of transmission is prone to signal distortion and interference.

AM reception, which travels both on the ground and through the air, is prone to interference by a variety of sources: other radio stations, lightning storms, and nightfall. An outlying AM station's signal can even reflect off the ionosphere and skip over areas that receive that signal during the day.

FM broadcasts deliver greater audio fidelity and are less susceptible to static, but also have reception-related challenges. Because all radio waves travel in straight lines, the best FM reception is received the radio is in an unobstructed, line-of-sight path from the transmitting antenna. Also, a radio frequency wave signal emitted from the transmitting tower weakens over lengthy distances. Moreover, FM signals bounce-off hard objects such as tall buildings or mountains creating disturbances known as "multi-path" ripples. These multiplied waves can cancel out the original broadcast signal at select points.

Satellite radio improves the conventional AM/FM radio potential by offering a better audio quality, greater coverage, and fewer commercials. Satellite radio includes transmission of substantially the same program content from two or more geosynchronous or geostationary satellites to both mobile and fixed receivers on the ground. In urban canyons and other high population density areas with limited line-of-sight (LOS) satellite coverage (a drawback of FM radio), terrestrial repeaters will broadcast the same program content in order to improve coverage reliability. To improve reception, signals are received from two satellites and one terrestrial repeater for combined spatial, frequency and time diversity, which provides significant mitigation of multi-path interference and addresses reception issues associated with blockage of the satellite signals.

One problem with a satellite radio is that the receiver contains sensitive electronic components which are needed to receive satellite radio signals. Known satellite radios such as those sold by XM Radio, also called satellite receivers, have been used in automobiles, "boom boxes", and in home stereo systems.

Thus, there is a need for a device that receives and plays back satellite signals that can also withstand outdoor harsh environmental conditions, such as those conditions at a construction job site.

SUMMARY OF THE INVENTION

According to an exemplary embodiment, the present invention is directed to a mobile receiver having a housing for a satellite receiver adapted to receive satellite radio frequencies. Attached to the housing and disposed over the satellite receiver is a protective covering. The housing has at least one user interface integral with a surface of the housing and at least one impact resistance member attached to the housing. The protective covering shields the satellite receiver from external contamination.

According to another exemplary embodiment, the present invention is directed to a mobile receiver having a housing defining a satellite receiver opening. A protective covering is disposed over the satellite receiver opening. The protective covering is hinged to the housing at one end and releasably engaged to the housing at an other end, similar to a door. The satellite receiver is adapted to mate with and be releasably retained within the satellite receiver opening and behind the protective covering thereby shielding the satellite receiver from dust, dirt, and moisture. Integral with a surface of the housing is a user interface to control the volume, frequency selection and power to the mobile receiver. A roll cage assembly is flexibly attached to the housing and extends beyond each planar surface of the housing to protect the housing from impact and vibration. To receive satellite radio signals, a satellite antenna is integrated within the roll cage assembly.

According to yet another exemplary embodiment, the present invention is directed to a mobile receiver having a housing defining a satellite receiver opening and a track assembly disposed about the satellite receiver opening. The track assembly has a flexible seal. The satellite receiver is adapted to mate with and be releasably retained within the satellite receiver opening. A protective door is slidable along the track assembly and engages the flexible seal. Integral with a surface of the housing is at least one user interface. Also on the surface of the housing is at least one impact resistance member. When the satellite receiver is retained within the satellite receiver opening, a relay transports the input signals from the user interface integral with a surface of the housing to the satellite receiver. In this manner, the volume, power, and frequency of the satellite radio can be controlled by the user interface when the satellite receiver is releasably retained within the satellite receiver opening and behind the slidable door so that the satellite receiver is shielded from environmental contamination such as dust, dirt, and moisture.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

Unless defined otherwise, all technical and scientific terms used herein have the same meaning as commonly understood by one of ordinary skill in the art to which the invention pertains. Although any methods and materials similar or equivalent to those described herein can be used in the practice of the present invention, the preferred materials and methods are described herein.

The mobile receiver of the present invention is constructed and designed with an outdoor use in mind, for example, the mobile receiver will be exposed to harsh environmental conditions such as dust, dirt, moisture, rain, vibrations, jarring, and rough surfaces. It therefore an object of the present invention to be substantially weather resistant. Therefore, the materials selected for construction are, for example, materials that are water repellant and substantially resistant to corrosion, including rust, rot, decay and UV damage. Exemplary materials include fiberglass or shatterproof and high-impact plastics, such as polypropylene, polyethylene terephthalate (PETE), low and high density polyethylene, vinyl and polyvinylchloride, polystyrene, and polypropylene. Any exposed electrical connections should made of non-corrosive metals, such as brass and stainless steel. Non-metal materials such as non-corroding aluminum and titanium may also be used.

Figure 1:
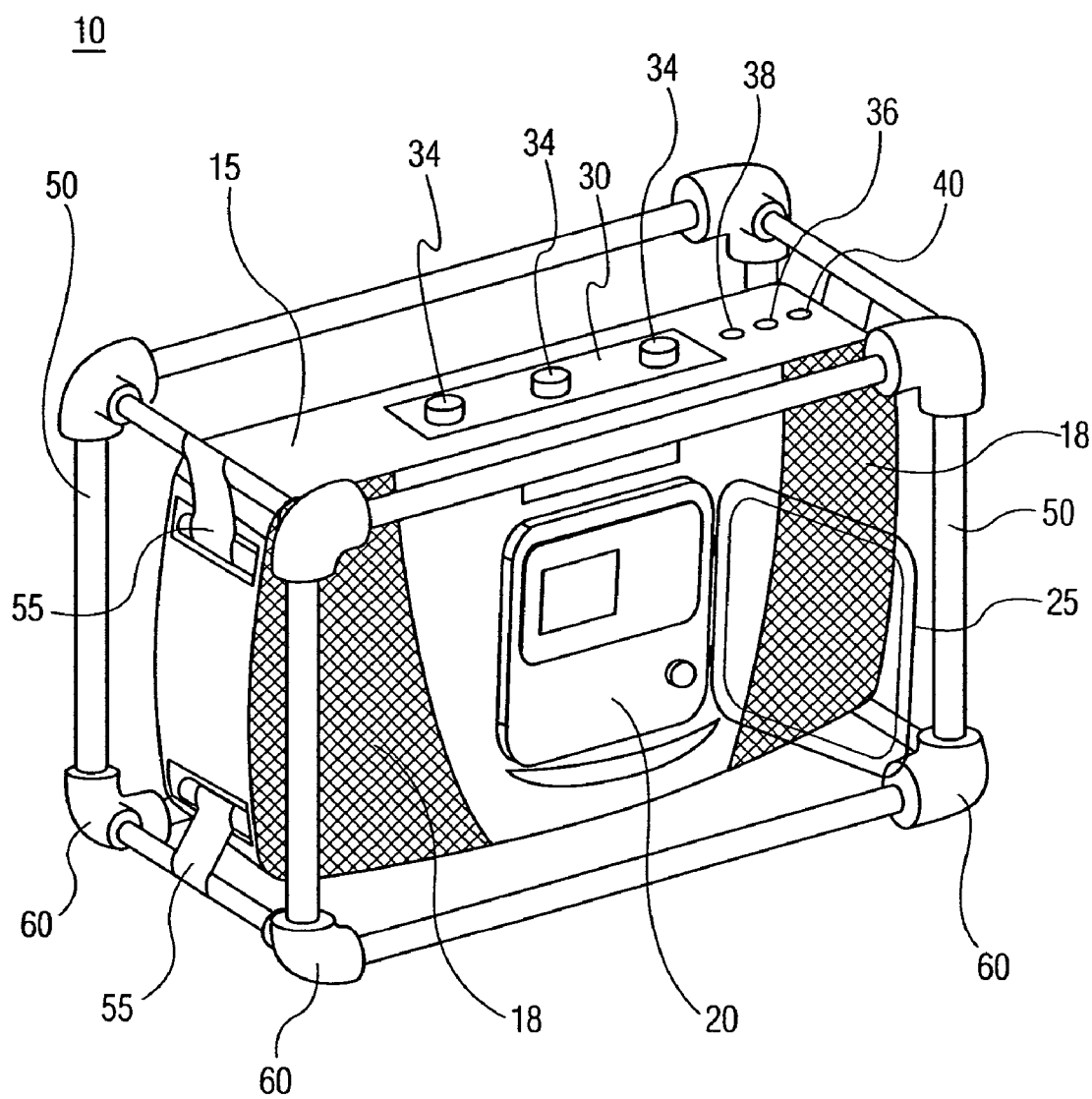
FIG. 1 is a front perspective view of a mobile receiver according to an exemplary embodiment of the present invention.

With reference to the Figures where like numerals represent like features, FIG. 1 illustrates an exemplary embodiment of a mobile receiver of the present invention. Mobile receiver 10 has housing 15. As shown in the exemplary embodiment of FIG. 1, although housing 15 is substantially rectangular in shape with rounded corners, other shapes are contemplated as would be appreciated by one skilled in the art. Particular shapes of housing 15 that have a low center of gravity are desirable. Housing 15 maintains the components of the mobile receiver. The components of the mobile receiver may be hermetically sealed within housing 15 to prevent environmental contamination.

As shown in the exemplary embodiment of FIG. 1, mobile receiver has speakers 18 disposed at opposing sides. Although two speakers are shown in the embodiment of FIG. 1, multiple speakers, including woofers and tweeter are contemplated as would be understood by one skilled in the art. Speakers 18 may be mounted in a speaker mount defined by housing 15, or may be contained within housing 15. When speakers 18 are contained within housing 15, housing 15 may be ported, however, such a port may be protected from direct environmental exposure. When speakers 18 are mounted integral with the surface of housing 15, speakers 18 may be constructed so that they are substantially weather resistant. Exemplary speakers constructed so as to be substantially weather resistant include speakers having a titanium-laminate dome with rubber surround, injected polypropylene with butyl rubber surround, polypropylene woofer, Mylar® midrange, and polypropylene mica woofer cones.

The mobile receiver of the present invention has satellite receiver 20 adapted to receive satellite radio frequencies. The Federal Communications Commission (FCC) granted two national satellite radio broadcast licenses that allocated 25 megahertz (MHZ) of the electromagnetic spectrum for satellite digital broadcasting. Two commercial satellite radio companies, Sirius Satellite Radio and XM Satellite Radio, Inc. each own 12.5 MHz of the 25 MHZ allocated spectrum. Satellite receiver 20 may be a device for receiving, storing, and playing back digital audio radio signals as describe in U.S. Pat. No. 6,785,656; the contents of which are incorporated herein by reference. Satellite receiver 20 may include controls for selecting satellite radio frequencies, volume, power, equalization of sound. Satellite receiver 20 may also include a display. Exemplary satellite receivers include those receivers sold by XM Satellite Radio, Inc., including the Delphi XM Roady™2, Delphi XM Roady™, Delphi XM SKYFi™, and XMCommander™; those sold by Sirius Satellite Radio, including the SIRIUS Sportster™ and Brix Streamer System SIR-STRPNP1; those sold by Blaupunkt, including the Blaupunkt America SR04; those sold by Audiovox, including the Audiovox SIR-PNP3; those sold by RadioShack, including the RadioShack Orbiter SR4000; and those sold by Jensen, including the Jensen CK100SR.

As shown in the exemplary embodiment of FIG. 1, satellite receiver 20 is integral with housing 15. As shown in other exemplary embodiments, for example those embodiments shown in FIG. 3, satellite receiver 20 may be a separate unit, releasably retained by housing 15. According to the exemplary embodiment shown in FIG. 3, when satellite receiver 20 is a separate unit, housing 15 defines satellite receiver opening 300 (or commonly called a docking port). Satellite receiver opening 300 has an electrical engagement mechanism 310, for example, engagement pins, to complete an electrical connection between satellite receiver 20 and mobile receiver 10.

Figure 2:
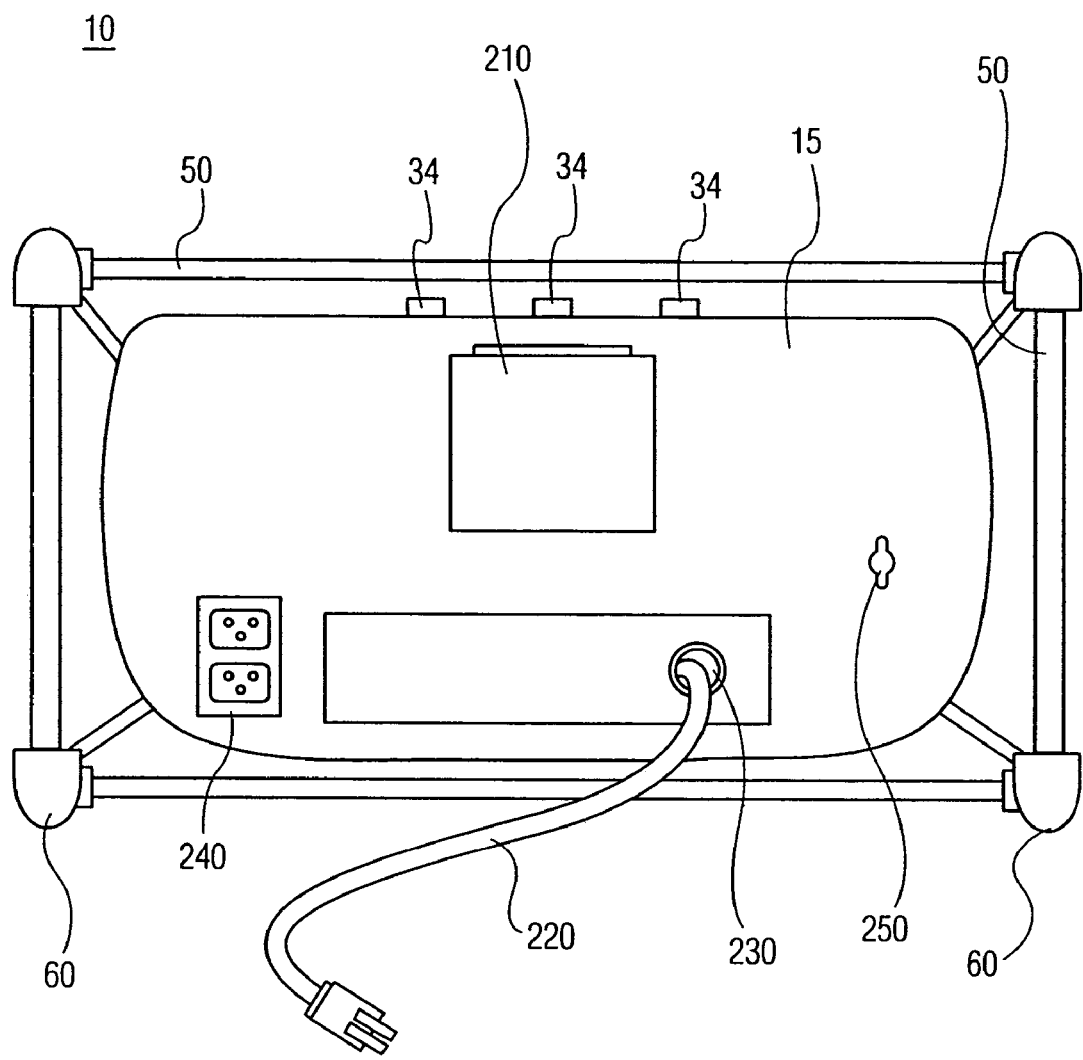
FIG. 2 is a rear perspective view of a mobile receiver according to an exemplary embodiment of the present invention.

Mobile receiver 10 has an antenna to receive the digital audio radio signals. The antenna may be an external detachable antenna that connects to external antenna port 250 as shown in FIG. 2, or may be an internal antenna.

Referring again to FIG. 1, protective covering 25 is attached to housing 15 and may be disposed over satellite receiver 20 to protect satellite receiver 20 from environmental contamination. Protective covering 25 may be, for example, a releasable detachable door hinged to housing 15 or a slidable door engaging a track assembly with a flexible seal. Protective covering 25 may be releasably secured to housing 15 by a latching mechanism, magnetic lock, or frictional fit. Protective covering 25 may be constructed of the same or different material from that of housing 15. Protective covering may be a transparent covering so that when protective covering 25 is disposed over satellite receiver 20, the display of satellite receiver 20 may be visible. Exemplary transparent materials include acrylic-based resins such as Lucite® and Perspex®.

Figure 3:
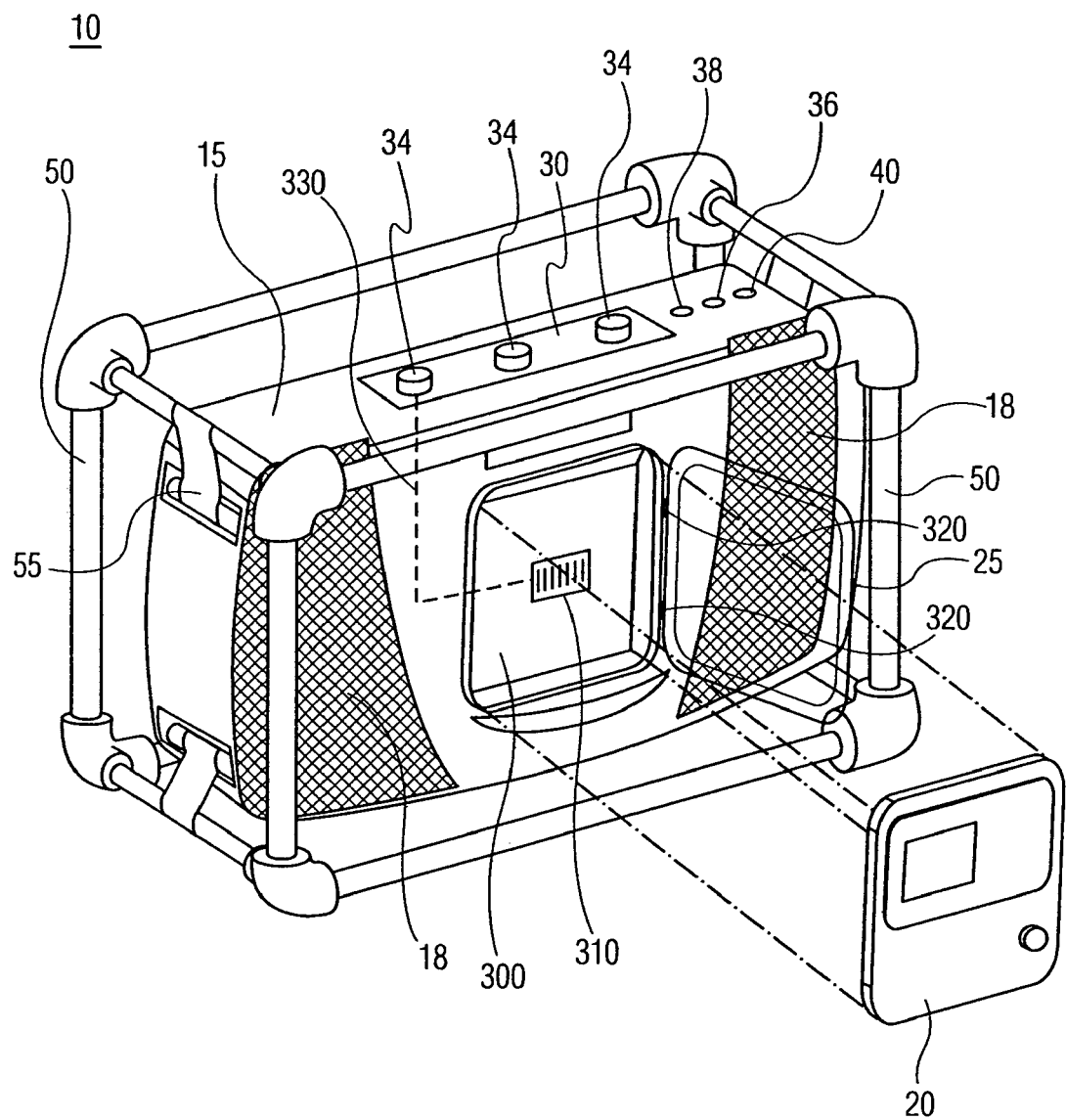
FIG. 3 is a front schematic view of a mobile radio receiver according to another exemplary embodiment of the present invention.
Figure 4:
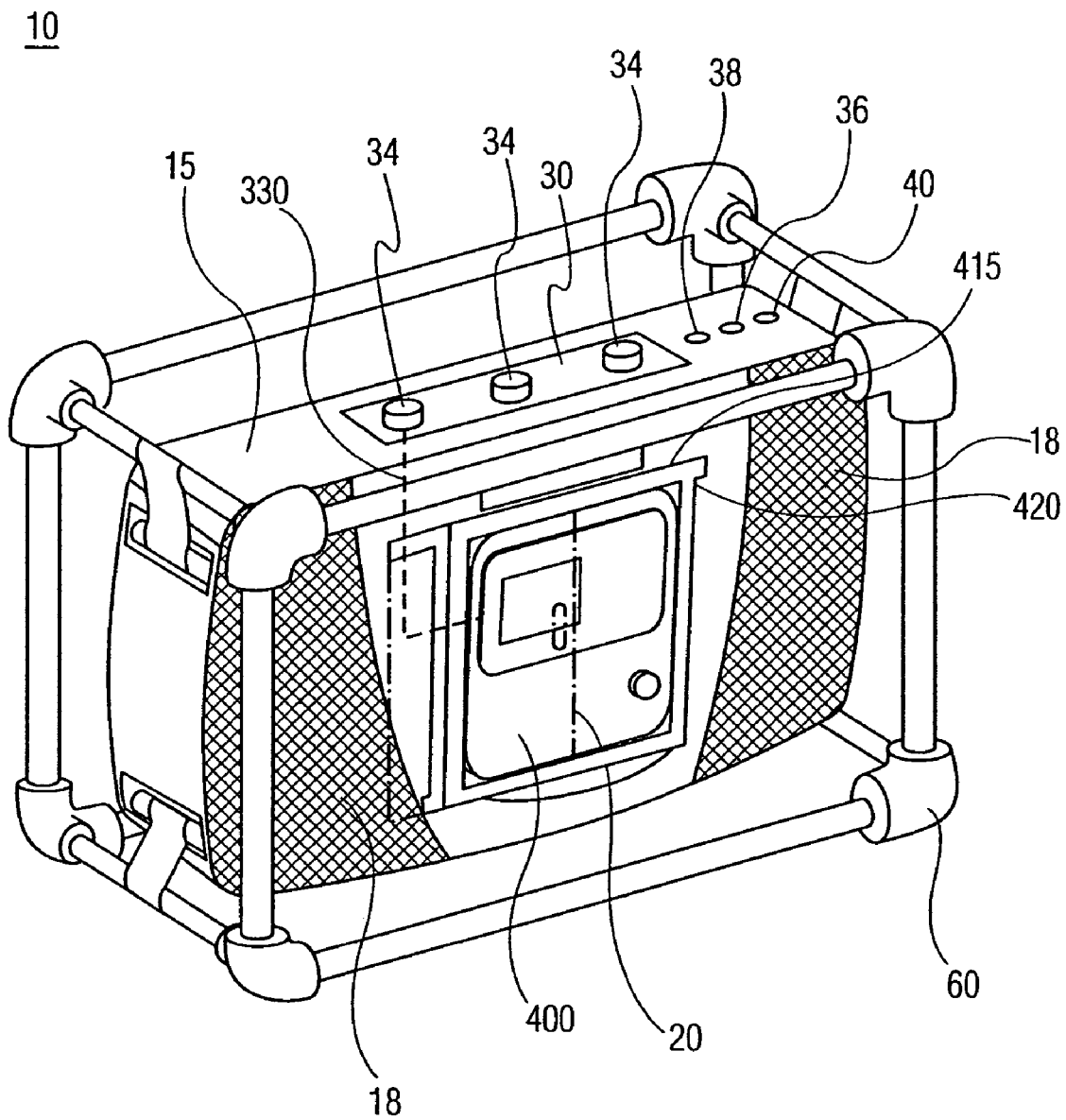
FIG. 4 is a front schematic view of a mobile radio receiver according to yet another exemplary embodiment of the present invention.

According to one an exemplary embodiment shown in FIG. 3, protective covering may releasably disposed over satellite receiver opening 300 by hinge 320 such that protective covering 25 is a hinged door. FIG. 3 shows protective covering 25 hinged at the top of satellite receiver opening 300, however, protective covering 25 may be attached via hinge 310 at any side of satellite opening 300. According to another exemplary embodiment of the present invention as shown in FIG. 4, protective covering 25 may be slidable door 400 that engages track assembly 415 disposed about satellite receiver opening 300. Track assembly 415 has flexible seal 420 to engage protective covering 25 to substantially shield satellite receiver 20 from environmental contamination.

Referring again to FIG. 1, housing 15 has at least one user interface 30 integral with a surface of housing 15. As shown in the embodiment of FIG. 1, user interface 30 is disposed on the top of housing 15, however, user interface 30 may be disposed on the face of mobile receiver 10 or any other suitable location that would be consistent with the knowledge of one skilled in the art. User interface 30 may contain weatherproof controls for mobile receiver 10 such a slide-rule tuning, push-button power, rotary volume controls 34, auto bass boost for low listening levels (not shown), weatherproof headphone jack 36 for private listening, weatherproof auxiliary input jack 38, and weatherproof microphone jack 40 for public address announcements.

Referring now to FIG. 4, which illustrates satellite receiver 20 as a separate unit, when satellite receiver 20 is mounted into satellite receiver opening 300 and protective covering 25 (shown as a slidable door 400) is disposed over satellite receiver 300, a user cannot access the controls of satellite receiver 300 without opening slidable door 400 and exposing satellite receiver 20 to environmental contamination. The exemplary embodiment of the present invention shown in FIG. 3, shows relay 330 to transport input signals back and forth from the controls of user interface 30 to satellite receiver 20 by way of engagement pins 310. Thus, without exposing satellite receiver 20 to environmental conditions by removing protective covering 25, the volume, power, and frequency of mobile receiver 10 is controlled by user interface 30 when the separate unit satellite receiver 20 is releasably retained within satellite receiver opening 300 and shielded from contamination by protective cover 25.

According to an embodiment of the present invention shown in FIG. 1, mobile receiver 10 is protected from impact, jarring, vibration, and rough surfaces by at least one impact resistance member 50 attached to housing 15. Impact resistance member 50 extends beyond each planar surface of housing 15 so that if mobile receiver 10 is knocked over or bumped, the surface of housing 15, including satellite receiver 20 protected behind protective cover 25 is not damaged. As shown in more detail in FIGS. 5a and 5b, impact resistance member 50 extends not only beyond each planar surface of housing 15, but also extends beyond user interface 30 so that if user interface 30 include protruding knobs or dials (e.g., controls 34), such knobs and dials will be protected from impact. When impact resistance member 50 is a roll cage as shown in FIGS. 1-5a, impact resistance member 50 absorbs shock, vibration, and impact loads through attachment dampening members 55, which secure impact resistance member 50 to housing 15. Attachment dampening members 55 may be constructed of material known to one skill in the art to absorb impact, for example, springs, grommets, bumbers, fasteners, and foam padding. As shown in the exemplary embodiment of FIGS. 1-5a, attachment dampening members 55 are a tensioned cloth or synthetic fabric that suspends housing 15 inside of impact resistance members 50.

Figure 5B:
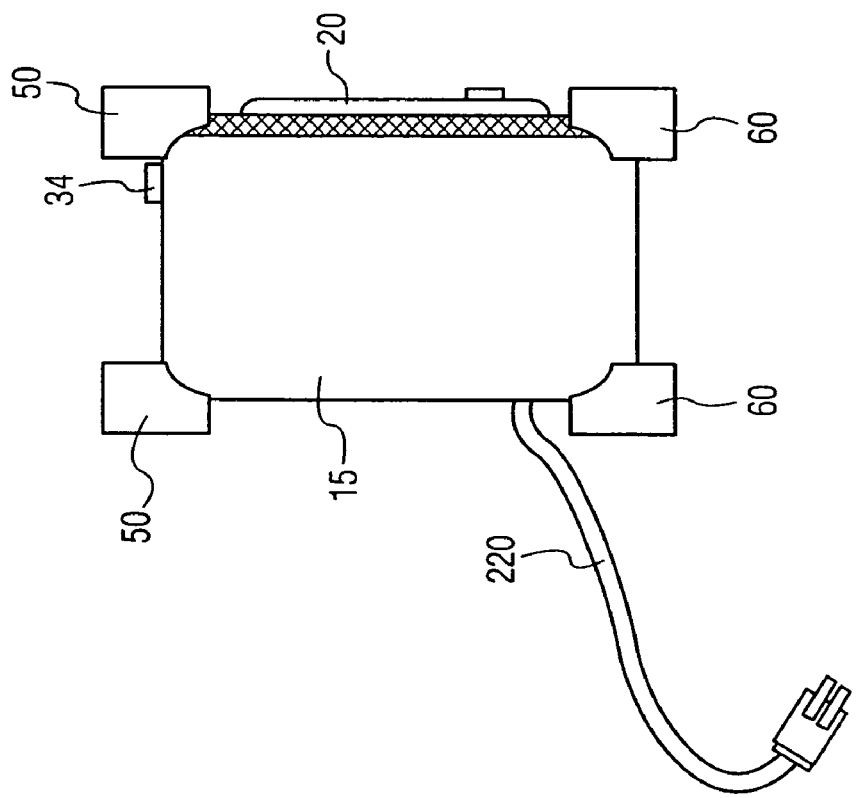
FIG. 5b is a side schematic view of another exemplary embodiment of the present invention.
Figure 5A:
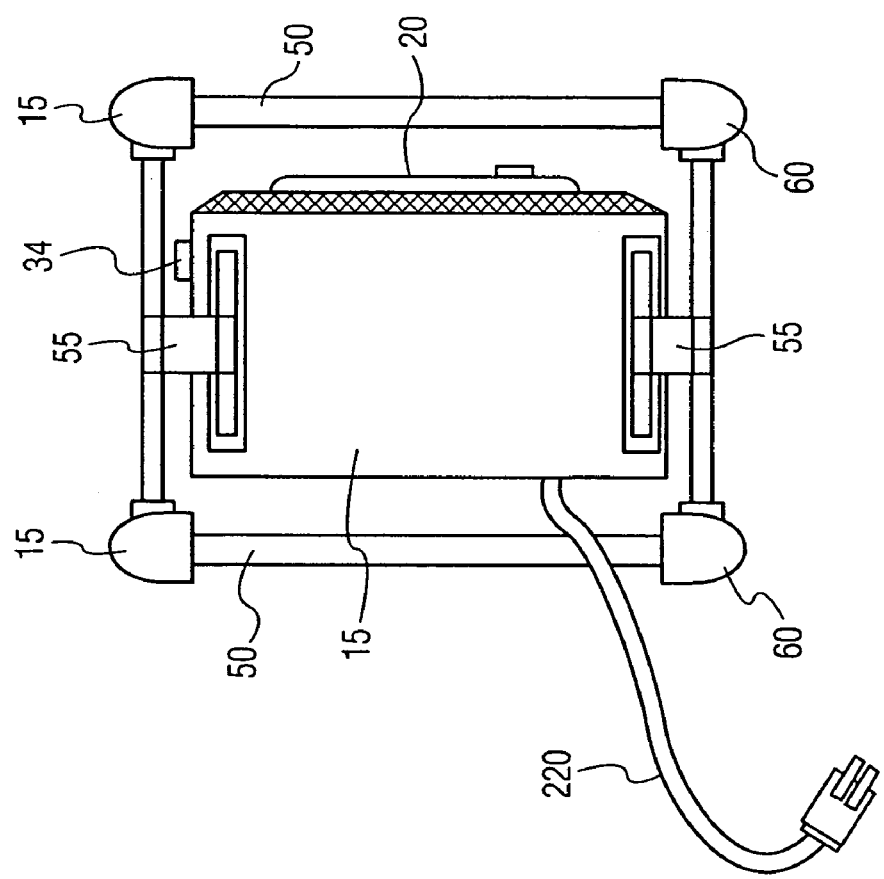
FIG. 5a is a side schematic view of an exemplary embodiment of the present invention.

As shown in the exemplary embodiment of FIG. 1-5a, impact resistance member 50 is a roll cage assembly. The roll cage assembly may be constructed from heavy-duty protective polypropylene formed into a "roll bar" cage that protects mobile receiver 10 components from "rollover" damage. Also, mobile receiver 10 may be constructed with a low center of gravity to help prevent "rollover." When impact resistance member 50 is a roll cage assembly, mobile receiver 10 may have an internal antenna 65 disposed and protected within a roll bar of the roll cage. Disposed on the bottom of impact resistance member 50, are additional shock absorbers, for example non-slip feet 60, that may be made from synthesized rubber or other suitable material known to one skilled in the art. Non-slip feet 60 maintain mobile receiver 10 above a surface (e.g., off the ground) to prevent mobile receiver 10 from being exposed to ground moisture. According to another exemplary embodiment of the present invention shown in FIGS. 4 and 5a, impact resistance member 50 may be oversized corners constructed from shock absorbing materials, which extend beyond the surface of housing 15. As shown in FIGS. 4 and 5a, impact resistance members 50 are dispose on the corners of housing 15, however, impact resistance members 50 may also be disposed on any surface of housing 15 to prevent housing 15 from impact.

FIG. 2 is a rear perspective view of a mobile receiver according to an exemplary embodiment of the present invention. The rear of mobile receiver 10 includes a self-contained power-supply such as a battery component 210 or an AC power supply cord 220. AC power cord is a heavy gauge insulated power cord and can be stored in storage compartment 230. When mobile receiver 10 is supplied with power from battery component 210, battery component 210 may be one or more alkaline batteries, rechargeable NiCad batteries, or batteries such as those used in commonly manufactured cordless hand-held tools and equipment. Mobile receiver 10 may also be powered from 12 v car-battery current. When mobile receiver 10 is receiving power from other than battery component 210, mobile receiver 10 may serve to recharge the batteries plugged into battery component 210. In this manner, mobile receiver 10 serves as a satellite radio and a battery recharger. Also shown in FIG. 2 are AC electric outlets 240 for external equipment such as lighting or corded tools. While two AC electric outlets are shown, any number of electric outlets are contemplated.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A mobile receiver comprising:
   a housing defining a satellite receiver opening and a non-satellite receiver portion;
   a satellite receiver having a display and adapted to receive satellite radio frequencies, the satellite receiver releasably retained within, and when plugged, having an electrical engagement with, the satellite receiver opening;
   a protective covering attached to the housing and disposed over the satellite receiver opening and not the non-satellite receiver portion, the protective covering shields the satellite receiver from external contamination;
   at least one user interface integral with a surface of the housing;

at least one impact resistance member attached to the housing and extending beyond each planar surface of the housing, whereby the planar surface of the housing are protected from impact and vibration; and wherein when the satellite receiver is releasably retained and plugged in electrical engagement with the satellite receiver opening and shielded from contamination by the protective covering, a relay transports input signals from a user interface which is integral with the surface of the housing to the satellite receiver, whereby volume, power, and frequency of the satellite receiver are controlled by the user interface integral with the housing.

2. The receiver of claim 1, wherein the housing, protective cover, and impact resistance member are constructed from materials selected form the group consisting of plastics, metals, titanium, aluminum, rubber, and mixtures thereof.

3. The receiver of claim 1, wherein the protective removable covering is hinged to the housing at one end of the satellite receiver opening, and releasable engages the housing at an other end of the satellite receiver opening to substantially shield the satellite receiver from external contamination.

4. The receiver of claim 3, wherein the track assembly has a flexible seal to engage the slidable door to substantially shield the satellite receiver from environmental contamination.

5. The receiver of claim 1, wherein the protective covering is a slidable door that engages a track assembly disposed about the satellite receiver opening.

6. The receiver of claim 1, wherein the protective covering is a transparent, shatterproof plastic.

7. The receiver of claim 6, wherein the protective removable cover is an acrylic-based plastic.

8. The receiver of claim 1, wherein the at least one user interface integral with a surface of the housing is selected from the group consisting of a volume control, frequency selection, and power supply.

9. The receiver of claim 8, wherein the at least one user interface integral with a surface of the housing is a slide-rule tuning and rotary power/volume control.

10. The receiver of claim 1, wherein the impact resistance member is a roll cage assembly.

11. The radio of claim 10 further comprising a satellite antenna integrated within the roll cage assembly.

12. The receiver of claim 10, wherein the roll cage assembly is constructed from polypropylene.

13. The receiver of claim 1, wherein the impact resistance member comprise shock absorbers attached to and disposed about the housing to protect the housing from impact.

14. The receiver of claim 13, wherein the shock absorbers comprise non-slip rubber feet.

15. The receiver of claim 1 further comprising a satellite antenna integrated within the housing.

* * * * *